United States Patent
Nesta et al.

(10) Patent No.: US 10,957,338 B2
(45) Date of Patent: Mar. 23, 2021

(54) 360-DEGREE MULTI-SOURCE LOCATION DETECTION, TRACKING AND ENHANCEMENT

(71) Applicant: SYNAPTICS INCORPORATED, San Jose, CA (US)

(72) Inventors: Francesco Nesta, Aliso Viejo, CA (US); Saeed Mosayyebpour Kaskari, Irvine, CA (US); Dror Givon, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/414,677

(22) Filed: May 16, 2019

(65) Prior Publication Data
US 2019/0355373 A1  Nov. 21, 2019

Related U.S. Application Data

(60) Provisional application No. 62/672,509, filed on May 16, 2018.

(51) Int. Cl.
*G10L 21/028* (2013.01)
*H04S 7/00* (2006.01)
(Continued)

(52) U.S. Cl.
CPC ............ *G10L 21/028* (2013.01); *G10L 25/84* (2013.01); *H04R 1/406* (2013.01); *H04S 7/303* (2013.01); *H04S 2400/01* (2013.01)

(58) Field of Classification Search
CPC ......... G10L 15/00; G10L 15/20; G10L 15/22; G10L 21/038; G10L 25/51; G10L 21/032;
(Continued)

(56) References Cited

U.S. PATENT DOCUMENTS 10,412,488 B2 * 9/2019 Kjems ..................... G10L 15/20
10,504,539 B2 * 12/2019 Kaskari ................... G10L 15/22
(Continued)

OTHER PUBLICATIONS

Nesta, Francesco, et al. "Enhanced multidimensional spatial functions for unambiguous localization of multiple sparse acoustic sources," IEEE International Conference on Acoustics, Speech and Signal Processing (ICASSP), 2012, pp. 213-216, Kyoto.
(Continued)

*Primary Examiner* — Disler Paul
(74) *Attorney, Agent, or Firm* — Haynes and Boone, LLP

(57) ABSTRACT

Audio processing systems and methods comprise an audio sensor array configured to receive a multichannel audio input and generate a corresponding multichannel audio signal and a target activity detector configured to identify audio target sources in the multichannel audio signal. The target activity detector includes a VAD, an instantaneous locations component configured to detect a location of a plurality of audio sources, a dominant locations component configured to selectively buffer a subset of the plurality of audio sources comprising dominant audio sources, a source tracker configured to track locations of the dominant audio sources over time, and a dominance selection component configured to select the dominant target sources for further audio processing. The instantaneous location component computes a discrete spatial map comprising the location of the plurality of audio sources, and the dominant location component selects N of the dominant sources from the discrete spatial map for source tracking.

20 Claims, 7 Drawing Sheets

(51) Int. Cl.
*G10L 25/84* (2013.01)
*H04R 1/40* (2006.01)

(58) Field of Classification Search
CPC ... G10L 21/0232; G10L 21/028; G10L 25/84; G10L 25/78; G10L 25/21; G10L 25/18; H04R 3/00; H04R 1/406; H04R 1/3005
USPC ........................................ 381/56, 91–92, 303
See application file for complete search history.

(56) References Cited

U.S. PATENT DOCUMENTS

| | | | |
|---|---|---|---|
| 2008/0317259 A1* | 12/2008 | Zhang | G10L 15/04 381/92 |
| 2012/0183149 A1* | 7/2012 | Hiroe | G10L 25/48 381/56 |
| 2014/0328487 A1* | 11/2014 | Hiroe | G10L 21/0272 381/56 |

OTHER PUBLICATIONS

Lombard, Anthony, et al."Multidimensional Localization of Multiple Sound Sources Using Blind Adaptive MIMO System Identification," IEEE International Conference on Multisensor Fusion and Integration for Intelligent Systems, 2006, pp. 7-12, Heidelberg.

Brutti, Alessio, et al. "Tracking of multidimensional TDOA for multiple sources with distributed microphone pairs", CSL, 2013, pp. 660-682, Italy.

* cited by examiner

360-DEGREE MULTI-SOURCE LOCATION DETECTION, TRACKING AND ENHANCEMENT

CROSS-REFERENCE TO RELATED APPLICATIONS

The present disclosure claims the benefit of and priority to U.S. Provisional Application No. 62/672,509 filed May 16, 2018, titled "360-DEGREE MULTI-SOURCE LOCATION DETECTION, TRACKING AND ENHANCEMENT," which is incorporated herein by reference in its entirety.

TECHNICAL FIELD

The present application, in accordance with one or more embodiments, relates generally to systems and methods for audio signal detection and processing and, more particularly, for example, to detecting, tracking and/or enhancing one or more audio targets.

BACKGROUND

Many conventional audio systems include speech enhancement components to enable automatic speech command recognition or speech communication in noisy environments. Traditional enhancement methods rely on spatial constraints or the estimation of the speech and noise activity. During speech activity, such systems train filter parameters to enhance the related audio signal while canceling the ambient noise. During noise activity, a spatial/spectral noise statistic is estimated to induce the filtering system to suppress the noise.

Estimating the spatial location of acoustic sources in the environment can provide useful information to supervise the enhancement. If the target speaker location is known, spatial constraints can be imposed in the filter to produce an output which has a limited distortion in the direction of the target speaker while suppressing the sound coming from other directions. If the target speaker location is known, the target speaker's activity can be inferred by looking at the dominant direction in a particular frame of data. For example, directional Voice Activity Detection (VAD) can be derived to supervise a spatial filter which would enhance that particular target speaker while suppressing the remaining noise. If the coherent noise source locations are known, spatial filters can be appropriately constructed to suppress them, for example, through beamforming.

One of the challenges for an automatic speech enhancement system is to determine with little supervision the dominant speaker direction. Many source localization/tracking frameworks have been proposed which exploit mixture models in the spatial domains and statistical tracking based on Monte Carlo methods. While these methods are theoretically valid, they are often impractical for applications with low memory and computation footprint and often cannot handle these operations on-line without applying complex inferences from a batch of several data observations. The source localization task is often performed using global spatial likelihood functions, such as the steered response power-phase transform (SRP-PHAT) algorithm, or through time-delay estimation and triangulation. However, these techniques are not often sufficiently accurate when multiple sources are active at the same time, due to multidimensional ghost source issues, for example. Other methods based on multiple-input multiple-output (MIMO) system identification may not be appropriate in implementations with under-determined conditions (e.g., when there are more sources than microphones) and often require high computational power. In many systems, tracking is often performed through computationally expensive state-space methods which may be solely based on the source position and then subject to ambiguities when the speaker trajectories cross to each other. Furthermore, these methods do not model the concept of the source dominance in the signal power domain and are not guaranteed to track the most dominant sources.

In view of the foregoing, there is a continued need in the art for improved detection, tracking and/or enhancement of audio from audio targets in noisy environments.

SUMMARY

The present disclosure provides methods and systems for detecting, tracking and/or enhancing a target audio source, such as human speech, in a noisy audio signal. In one or more embodiments, an audio processing device includes an audio sensor array and an audio signal processor. The audio sensor array includes a plurality of audio sensors, each configured to receive an audio input and generate a corresponding audio signal. In one embodiment, the audio signal processor includes audio input circuitry, a sub-band frequency analyzer, a target activity detector, a target enhancement engine and a synthesizer.

In various embodiments, the target activity detector receives sub-band audio channels which are provided to an instantaneous location analysis component and an average power component. The instantaneous location analysis component produces estimates of target directions, which are provided to a power clustering engine and a dominant location component. The dominant location component stores dominant locations on a first-in-first-out basis, which are then provided to a source tracker. The average power component provides average detected speech power to the power clustering component, which also receives an output from the source tracker. If speech is not detected, the power is set to 0. Dominant selection component receives the output from the source tracker and the power clustering component and outputs the dominant directions and voice activity detections of the target speakers, which may be used, for example, by the target enhancement engine.

In one embodiment, an audio processing device comprises an audio sensor array configured to receive a multichannel audio input and generate a corresponding multichannel audio signal, and a target activity detector configured to identify an audio target source in the multichannel audio signal. The audio sensor array may comprise a planar arrangement of three or four microphones arranged in two microphone pairs. The target activity detector may comprise an instantaneous locations component configured to detect a location of a plurality of audio sources, a dominant locations component configured to selectively buffer a subset of the plurality of audio sources comprising dominant audio sources, a source tracker configured to track locations of the dominant audio sources over time, and a dominance selection component configured to select dominant target sources for further audio processing.

In various embodiments, the audio processing device includes a sub-band analysis component arranged to receive the multichannel audio signal and transform each channel into a plurality of frequency sub-bands. The target activity detector may further comprise an average power component configured to calculate an average signal power for frames of the plurality of frequency sub-bands. A synthesizer configured to reconstruct the plurality of frequency sub-bands to form a time domain signal comprising the enhanced audio signal may also be provided.

In one embodiment, the instantaneous location component is further configured to compute a discrete spatial map comprising the location of the plurality of audio sources. The dominant locations component is further configured to select N of the dominant sources from the discrete spatial map, and the source track is further configured to apply a repulsion to the dominant audio sources. The audio processing device may also comprise a target enhancement engine configured to receive the multichannel audio signal and dominant target source information and output enhanced audio signals comprising the dominant target sources.

In various embodiments, a method for processing audio signals comprises receiving, via an audio sensor array, a multichannel audio input and generating a corresponding multichannel audio signal, and detecting, via a target activity detector, an audio target source in the multichannel audio signal. The detecting an audio target source comprises detecting an instantaneous location of each of a plurality of audio sources in the multichannel audio signal, buffering a plurality of dominant audio source locations selected from the detected plurality of audio sources, tracking audio source locations, including the dominant audio source locations; and selecting dominant target sources for further audio processing.

In various embodiments, the method further comprises transforming each channel of the multichannel audio signal into a series of frames comprising a plurality of frequency sub-bands, calculating an average signal power for the frames of the plurality of frequency sub-bands, and reconstructing the frequency sub-bands into a time domain signal comprising the enhanced audio signal. The method may further comprise detecting an instantaneous location further comprises computing a discrete spatial map, selecting N dominant sources from the discrete spatial map, and applying a repulsion to the dominant audio source locations. The method may further comprise enhancing the dominant target sources in the multichannel audio signal to generate enhanced audio signal outputs.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
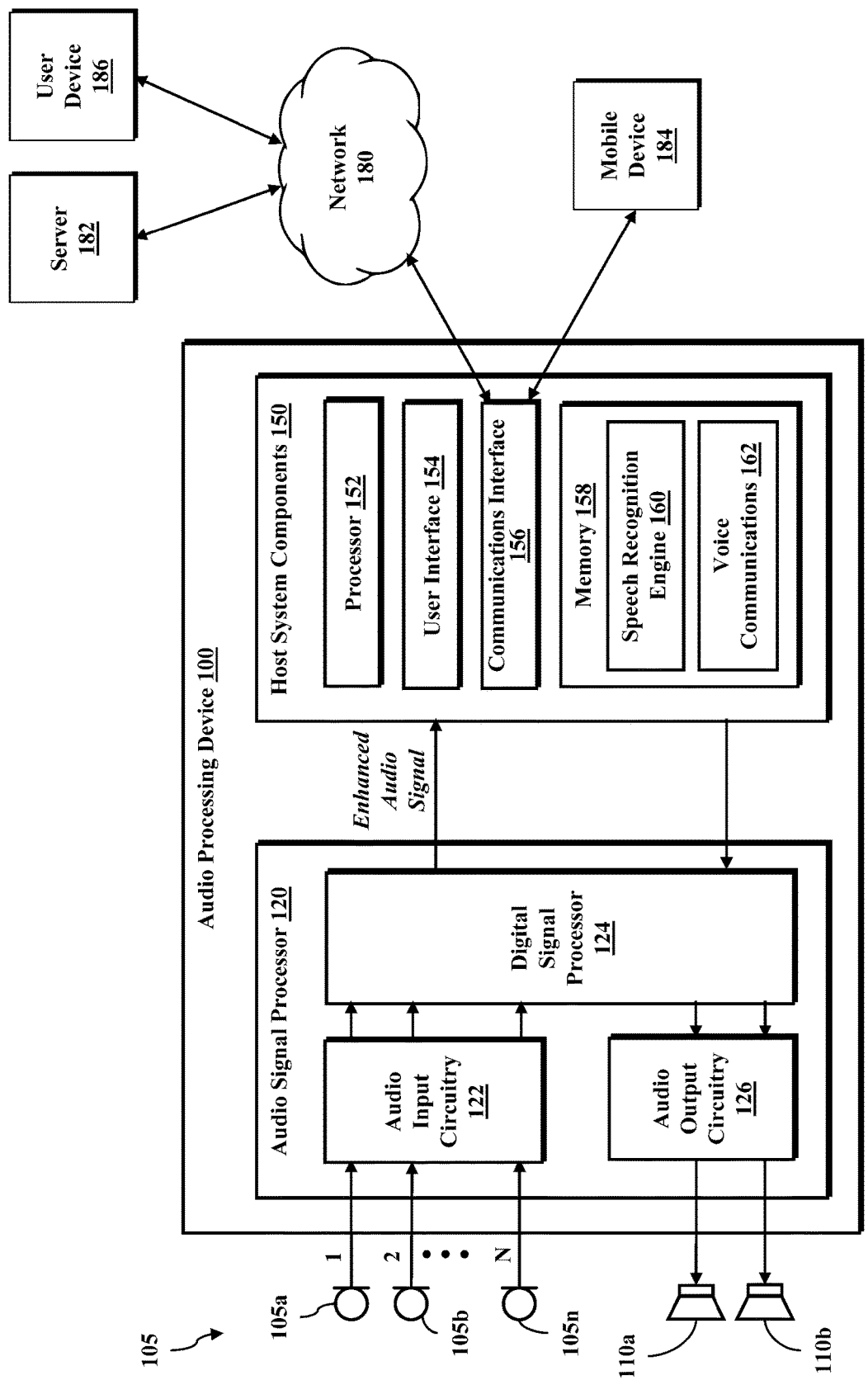
FIG. 1 illustrates a system configured to provide 360-degree multi-source location detection, tracking and enhancement, in accordance with one or more embodiments of the present disclosure.

Disclosed herein are systems and methods for detecting, tracking and/or enhancing a target audio source, such as human speech, in a noisy audio signal. In many real-world applications, the audio in the environment could be generated by a number of different sources which might include stationary and non-stationary sources such as music and speech. However, during voice interaction, the target person often raises his voice over the surrounding noise in order to be heard, especially when interacting in far-field scenarios. Various systems and methods disclosed herein provide an audio processing system which is able to quickly track the directions of localized acoustic sources and determine which one is the loudest source in a given time frame.

In adaptive multichannel signal processing, it is often required to localize an acoustic source in the 360 degree space in order to give a visual prompt to the user and properly control the speech enhancement algorithms to improve automatic speech recognition or Voice over IP performance. In various embodiments, improved acoustic scene analysis generally involves three tasks: (i) detection (i.e., be able to determine if a new source becomes active in a certain spatial location), (ii) tracking (i.e., be able to continuously track the movement of the source, and (iii) dominance profiling (i.e., be able to determine what source is dominant at a given time).

In various embodiments, systems and method providing an efficient framework for detecting, tracking and dominance profiling are disclosed. The systems and methods are able to adaptively initialize tracking for active sources and determine the dominant sources. Algorithms disclosed herein provide 360-degree localization with a planar cross-microphone array and is able to provide and update direction of arrival measurements for multiple sources.

In one embodiment, a system comprises an enhanced multidimensional spatial-temporal coherence likelihood, which provides a higher degree of spatial resolution even when multiple sources are active at the same time and when using a smaller number of audio input sensors. The proposed likelihood may also be robust to reverberation. The system and method may further comprise an approximated structure for detecting and initializing multiple source trackers, and a posterior source power clustering which provides an estimation of the average loudness of the detected sources. For speech implementations, a power speech dominance estimation component may be configured to associate a level of dominance to each track. The systems and methods may be used to determine the dominant sources among several other active noise sources for use in further audio processing, such as, for example, use in voice activated devices, voice command processing and voice over IP applications.

Systems and methods configured to track a plurality of concurrent sources in 360° by using a microphone array (e.g., with 3 or 4 microphones) are disclosed. In various embodiments, the system may be configured to provide (i) instantaneous direction of arrival (DOA) estimation based on non-linear multidimensional coherence functions, (ii) DOA estimation to reduce the effect of reverberation errors, (iii) approximated joint power and DOA source tracking, and/or (iv) a mechanism to track the most N dominant sources and discard the remaining ones.

FIG. 1 illustrates an audio processing device 100 according to various embodiments of the disclosure. The audio processing device 100 includes an audio input, such as an audio sensor array 105, an audio signal processor 120 and host system components 150. The audio sensor array 105 comprises one or more sensors, each of which may convert sound waves into an audio signal. In the illustrated environment, the audio sensor array 105 includes a plurality of microphones 105a-105n, each generating one audio channel of a multi-channel audio signal.

The audio signal processor 120 includes audio input circuitry 122, a digital signal processor 124 and optional audio output circuitry 126. In various embodiments the audio signal processor 120 may be implemented as an integrated circuit comprising analog circuitry, digital circuitry and the digital signal processor 124, which is configured to execute program instructions stored in memory. The audio input circuitry 122, for example, may include an interface to the audio sensor array 105, anti-aliasing filters, analog-to-digital converter circuitry, echo cancellation circuitry, and other audio processing circuitry and components.

The digital signal processor 124 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure.

The digital signal processor 124 is configured to process the multichannel digital audio input signal to generate an enhanced audio signal, which is output to one or more host system components 150. In one embodiment, the digital signal processor 124 is configured to interface and communicate with the host system components 150, such as through a bus or other electronic communications interface. In various embodiments, the multichannel audio signal includes a mixture of noise signals and at least one desired target audio signal (e.g., human speech), and the digital signal processor 124 is configured to isolate or enhance the desired target signal, while reducing or cancelling the undesired noise signals. The digital signal processor 124 may be configured to perform echo cancellation, noise cancellation, target signal enhancement, post-filtering, and other audio signal processing.

The optional audio output circuitry 126 processes audio signals received from the digital signal processor 124 for output to at least one speaker, such as speakers 110a and 110b. In various embodiments, the audio output circuitry 126 may include a digital-to-analog converter that converts one or more digital audio signals to corresponding analog signals and one or more amplifiers for driving the speakers 110a and 110b.

The audio processing device 100 may be implemented as any device configured to receive and detect target audio data, such as, for example, a mobile phone, smart speaker, tablet, laptop computer, desktop computer, voice-controlled appliance, or automobile. The host system components 150 may comprise various hardware and software components for operating the audio processing device 100. In the illustrated embodiment, the system components 150 include a processor 152, user interface components 154, a communications interface 156 for communicating with external devices and networks, such as network 180 (e.g., the Internet, the cloud, a local area network, or a cellular network) and mobile device 184, and a memory 158.

The processor 152 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 150 are configured to interface and communicate with the audio signal processor 120 and the other system components 150, such as through a bus or other electronic communications interface.

It will be appreciated that although the audio signal processor 120 and the host system components 150 are shown as incorporating a combination of hardware components, circuitry and software, in some embodiments, at least some or all of the functionalities that the hardware components and circuitries are configured to perform may be implemented as software modules being executed by the processing component 152 and/or digital signal processor 124 in response to software instructions and/or configuration data, stored in the memory 158 or firmware of the digital signal processor 124.

The memory 158 may be implemented as one or more memory devices configured to store data and information, including audio data and program instructions. Memory 158 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 152 may be configured to execute software instructions stored in the memory 158. In various embodiments, a speech recognition engine 160 is configured to process the enhanced audio signal received from the audio signal processor 120, including identifying and executing voice commands. Voice communications components 162 may be configured to facilitate voice communications with one or more external devices such as a mobile device 184 or user device 186, such as through a voice call over a mobile or cellular telephone network or a VoIP call over an IP (internet protocol) network. In various embodiments, voice communications include transmission of the enhanced audio signal to an external communications device.

The user interface components 154 may include a display, a touchpad display, a keypad, one or more buttons and/or other input/output components configured to enable a user to directly interact with the audio processing device 100.

The communications interface 156 facilitates communication between the audio processing device 100 and external devices. For example, the communications interface 156 may enable Wi-Fi (e.g., 802.11) or Bluetooth connections between the audio processing device 100 and one or more local devices, such as mobile device 184, or a wireless router providing network access to a remote server 182, such as through the network 180. In various embodiments, the communications interface 156 may include other wired and wireless communications components facilitating direct or indirect communications between the audio processing device 100 and one or more other devices.

Figure 2:
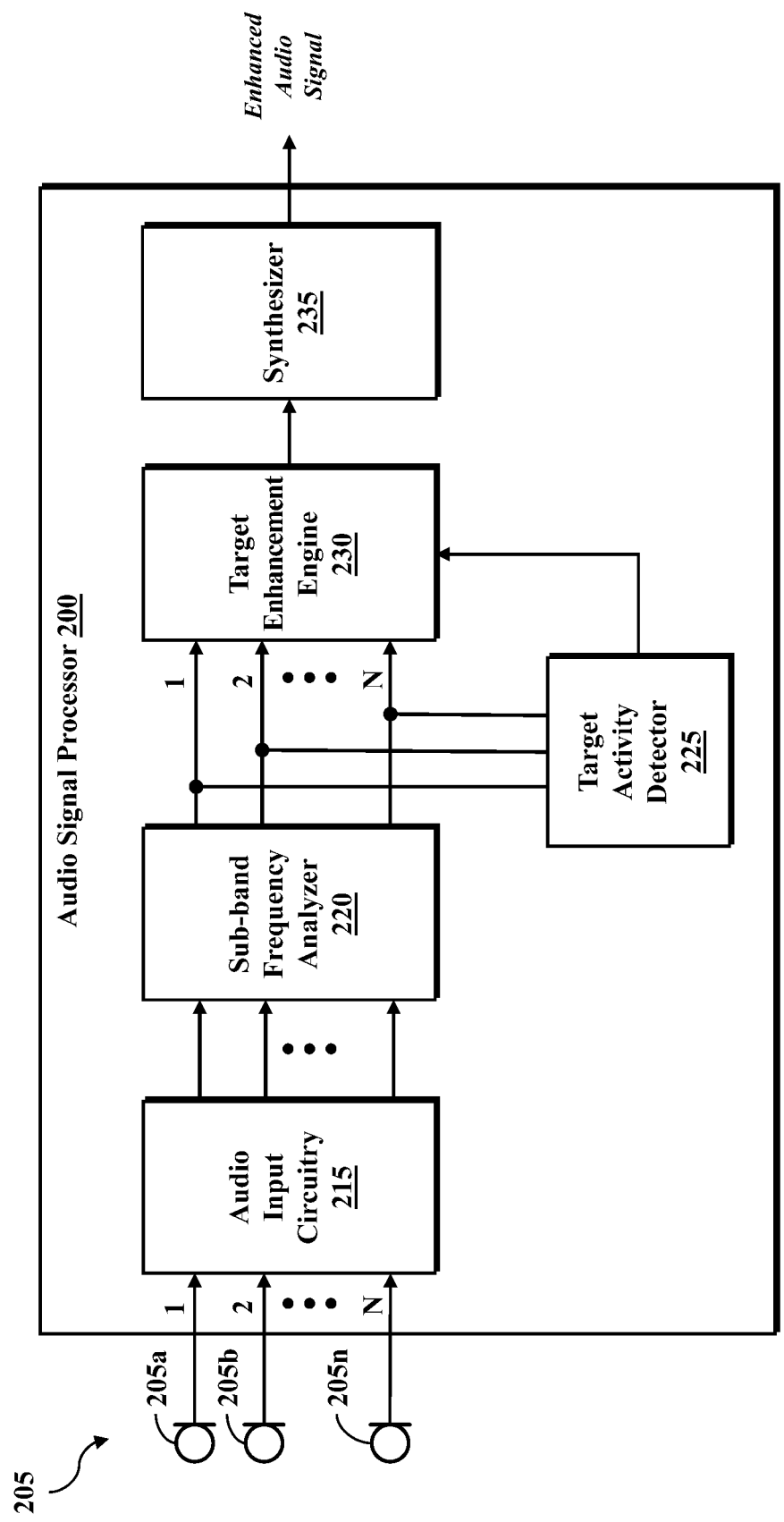
FIG. 2 illustrates an audio signal processor in accordance with one or more embodiments of the present disclosure.

FIG. 2 illustrates an audio signal processor 200 according to various embodiments of the disclosure. In some embodiments, the audio signal processor 200 is embodied as one or more integrated circuits including analog and digital circuitry and firmware logic implemented by a digital signal processor, such as digital signal processor 124 of FIG. 1. As illustrated, the audio signal processor 200 includes audio input circuitry 215, a sub-band frequency analyzer 220, a target activity detector 225, a target enhancement engine 230, and a synthesizer 235.

The audio signal processor 200 receives a multi-channel audio input from a plurality of audio sensors, such as a sensor array 205 comprising a plurality of audio sensors 205a-n. The audio sensors 205a-205n may include microphones that are integrated with an audio processing device, such as the audio processing device 100 of FIG. 1, external components connected thereto, or other arrangements for providing real time, multichannel audio input to audio signal processor 200.

The audio signals may be processed initially by the audio input circuitry 215, which may include anti-aliasing filters, analog to digital converters, and/or other audio input circuitry. In various embodiments, the audio input circuitry 215 outputs a digital, multichannel, time-domain audio signal having N channels, where N is the number of sensor (e.g., microphone) inputs. The multichannel audio signal is input to the sub-band frequency analyzer 220, which partitions the multichannel audio signal into successive frames and decomposes each frame of each channel into a plurality of frequency sub-bands. In various embodiments, the sub-band frequency analyzer 220 includes a Fourier transform process and the output comprises a plurality of frequency bins. The decomposed audio signals are then provided to the target activity detector 225 and the target enhancement engine 230.

The target activity detector 225 is configured to analyze the frames of one or more of the audio channels and generate a signal indicating whether target audio is present in the current frame. In various embodiments, the target audio may be any desired audio signal to be identified by the audio signal processor 200. When the target audio is human speech, the target activity detector 225 may be implemented as a voice activity detector configured to receive a frame of audio data and make a determination regarding the presence or absence of human speech in the frame. In some embodiments, the target activity detector 225 detects and tracks multiple audio sources and identifies the presence or absence of human speech from one or more target sources. The presence of speech may be determined, for example, by applying target audio classification rules to the sub-band frames to compute a value which is then compared to a threshold value for generating a target activity signal. In various embodiments, the signal generated by the target activity detector 225 is a binary signal, such as an output of '1' to indicate a presence of target speech in the sub-band audio frame and the binary output of '0' to indicate an absence of target speech in the sub-band audio frame. The generated binary output is provided to the target enhancement engine 230 for further processing of the multichannel audio signal. In some embodiments, the target activity signal may comprise a probability of target presence, an indication that a determination of target presence cannot be made, or other target presence information in accordance with system requirements.

The target enhancement engine 230 receives the sub-band frames from the sub-band frequency analyzer 220 and the target activity signal from the target activity detector 225. The target enhancement engine 230 processes and enhances the portion of the audio signal determined to be the target audio source and suppresses the other portions of the audio signal which are determined to be noise.

After enhancing the target audio signal, the target enhancement engine 230 may pass the processed audio signal to the synthesizer 235, which reconstructs one or more of the multichannel audio signals on a frame-by-frame basis by combing the sub-bands to form an enhanced audio signal. The enhanced audio signal may then be transformed back to the time domain and sent to a system component or external device for further processing, such as voice command processing.

Figure 3:
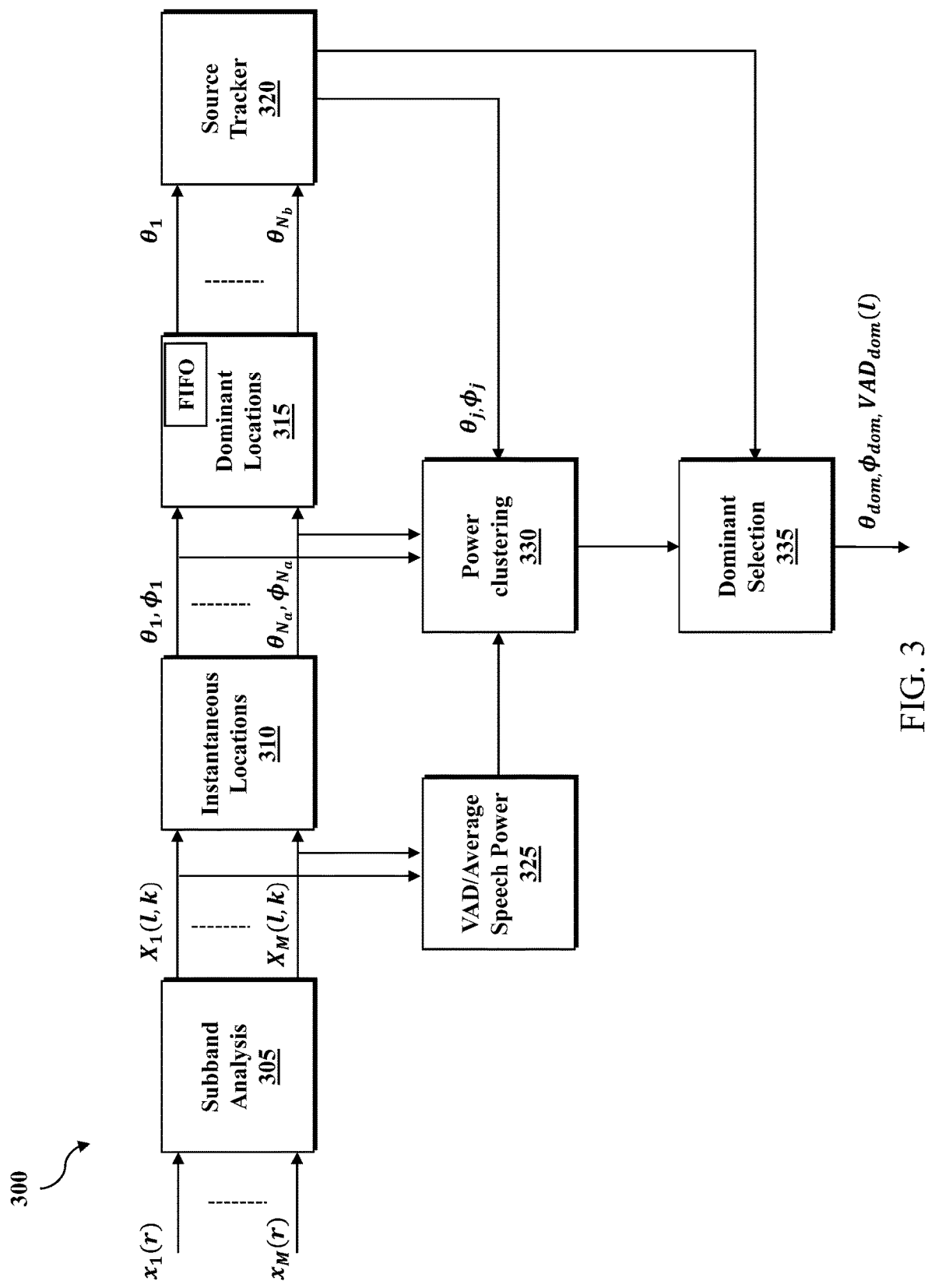
FIG. 3 illustrates a target activity detection system, in accordance with one or more embodiments of the present disclosure.

Referring to FIG. 3, an embodiment of a target activity detection system 300 will now be described. The target activity detection system 300 is configured to provide multi-localization source tracking. In operation, a multichannel time-domain audio input signal is received and transformed to the sub-band-domain through a sub-band analysis component 305 (e.g., Short-time Fourier Transform (STFT) or another sub-band analysis method can be used), such as subband frequency analyzer 220 of FIG. 2. The resulting sub-band signals are received by instantaneous locations component 310, which is configured to transform the sub-band signals into angular feature vectors which are used to compute an instantaneous location map. In one embodiment, a location of an audio source is estimated through a multi-dimensional likelihood function of source dominance at the direction of arrival (DOA) $\theta$ and azimuth $\phi$, exploiting the specific geometry of the microphone array (such as sensor array 105 of FIG. 1 and sensor array 205 of FIG. 2). The dominant locations component 315 selects and stores the $N_a$ most dominant locations in a FIFO memory buffer. The $N_b$ most frequent directions in the FIFO are then selected at every hop-size R. These directions, $\theta_1$ to $\theta_{N_b}$, are provided to the source tracker 320 which is configured to update the smooth DOA trajectories and unwrap the angles in the 360° domain. Source power clustering module 330 is configured to receive signal information from average speech power module 325, instantaneous locations module 310 and source tracker 320 for each incoming frame and determines the average power of the tracked directions. In some embodiments, power speech dominance estimation is performed to associate a level of dominance to each track. At the top of the source tracker 320 a free detection mechanism is run to determine if a new untracked source could replace a previously dead tracker, i.e. pointing to a source that became inactive. The dominant target sources are selected by dominant selection module 335.

Instantaneous DOA

Figure 4B:
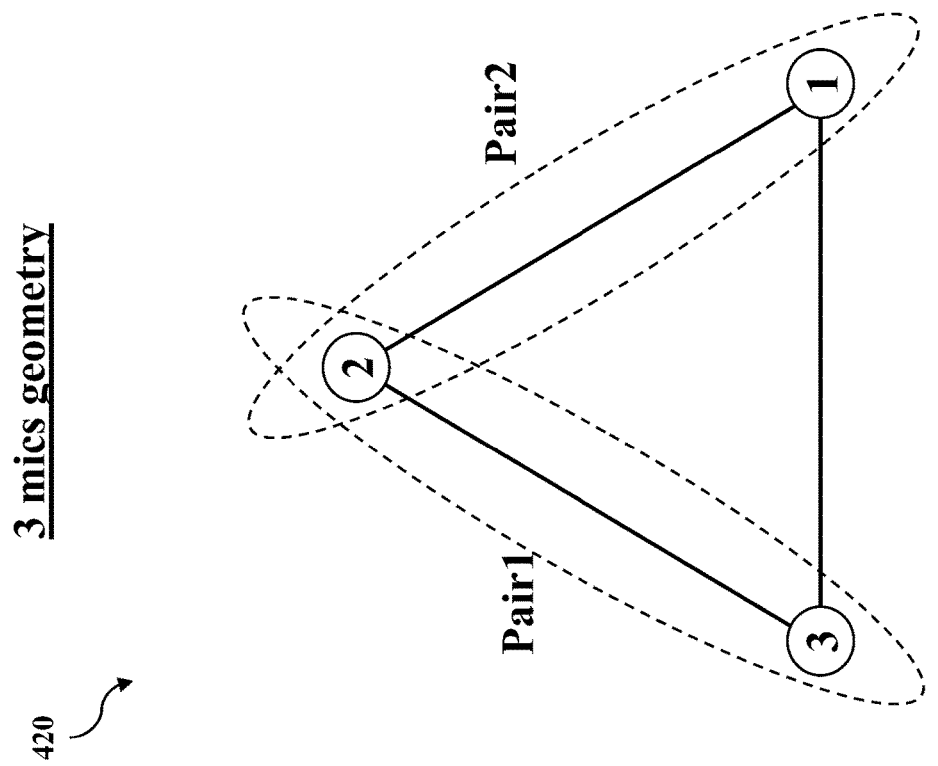
FIGS. 4A & 4B illustrate microphone array geometries, in accordance with one or more embodiments of the present disclosure.
Figure 4A:
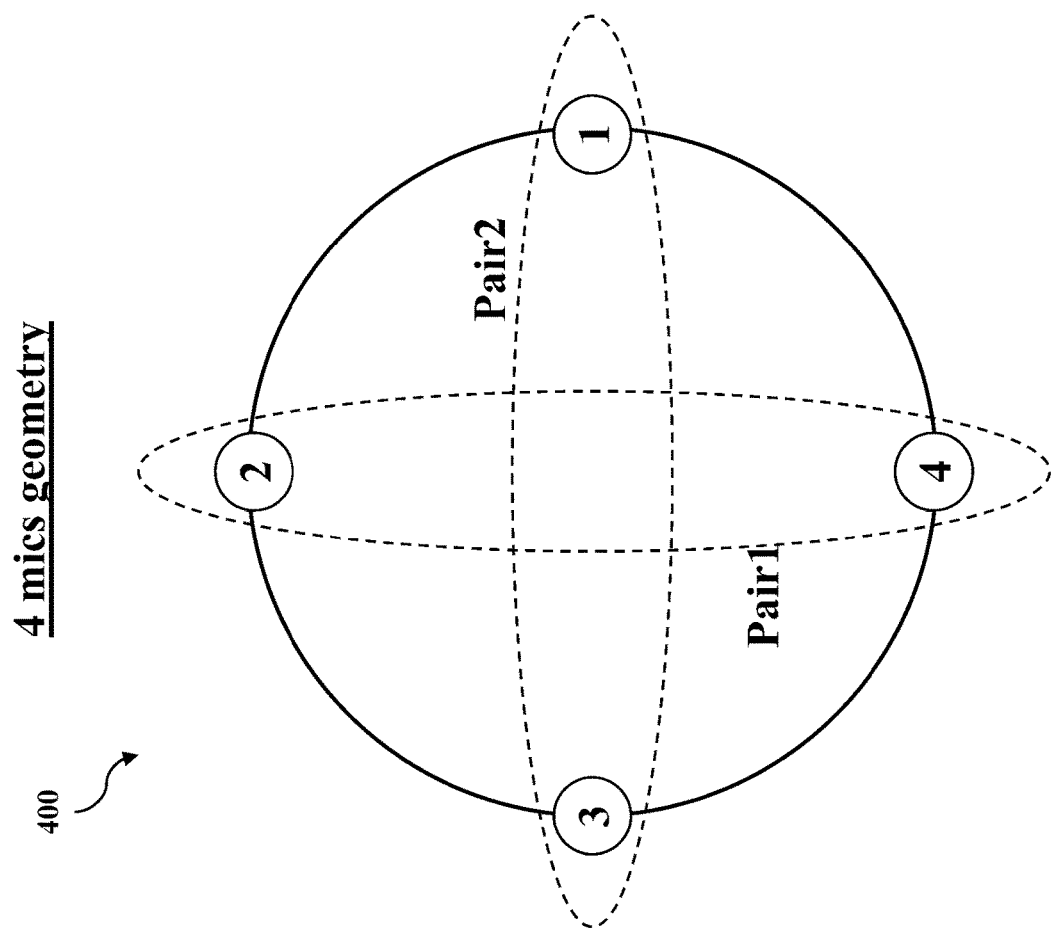

In FIG. 3, $x_m(r)$ denotes the sampled time-domain audio signal recorded at the mth microphone. Through the subband analysis component 305 the signal is transformed from time-domain to a sub-sampled time-frequency domain $X_m(l, k)$, where l indicates the sub-sampled time index and k indicates the frequency band index. In accordance with various embodiments, for performing an unambiguous 360° degree localization on a plane, at least three microphones are used in order to define two different microphone pairs. The microphones are to be located geometrically along different directions in the 2D space—for example, let $(m_1, m_2)$ and $(m_3, m_4)$ indicate the microphone indexes of two non-collinear pairs. An embodiment of a four microphone geometry 400 is illustrated in FIG. 4A and an embodiment of a three microphone geometry 420 is illustrated in FIG. 4B. In the case of an array with 3 microphones, two pair may have one microphone in common (e.g., $m_1 = m_3$). For the case of an array with 4 microphones, the microphones may be located in a cross configuration and the selected pairs may be oriented in orthogonal directions.

In various embodiments, it is assumed that a plurality of sources at the positions $\theta^i$ are emitting the signal $s^i(r)$. In free-field (i.e., no sound reflections), the signal recorded at each microphone $m_i$ is the delayed and attenuated version $\alpha_{m_1}^i s^i(r-T_{m_1}^i)$, where $T_{m_1}^i$ is the time of arrival (TOA), which is the time that the acoustic wave takes to travel from the $i^{th}$ source point to the microphone $m_1$, and $\alpha_{m_1}^i$ is an attenuation factor depending on the source-to-mic distance. In the discrete time-frequency domain, the recorded signal can be approximately represented as $$X_{m_1}(l, k) = \sum_i S_i(l, k) \alpha_{m_1}^i e^{-j2\pi \frac{k}{K} f_s T_{m_1}^i},$$

where K is the number of subbands and $f_s$ is the sampling frequency of the signal.

The spatial directional features may be defined by taking the normalized narrowband cross-correlation as $$f_1(l, k) = \frac{X_{m_1}(l, k) X_{m_2}(l, k)^*}{|X_{m_1}(l, k) X_{m_2}(l, k)^*|} \quad (1)$$

$$f_2(l, k) = \frac{X_{m_3}(l, k) X_{m_4}(l, k)^*}{|X_{m_3}(l, k) X_{m_4}(l, k)^*|}.$$

Neglecting the attenuations (e.g., assuming they are all similar) and assuming time-frequency source disjointness (e.g., two sources cannot dominate the same t–f point), the features may be approximated as $$f_1(l, k) \simeq e^{-j2\pi \frac{k}{K} f_s dT_1(l,k)}, \; dT_1(l, k) = T_{m_1}(l, k) - T_{m_2}(l, k) \quad (2)$$

$$f_2(l, k) \simeq e^{-j2\pi \frac{k}{K} f_s dT_2(l,k)}, \; dT_2(l, k) = T_{m_3}(l, k) - T_{m_4}(l, k)$$

where $dT_1(l,k)$ and $dT_2(l,k)$ represent the time-difference of arrival (TDOA) of the source dominating the time-frequency point $(l,k)$. Therefore, the features $f_1(l,k)$ and $f_2(l,k)$ are directly related to the source positions and by proper integration, an acoustic map may be derived representing an approximation of the probability density function of the average spatial acoustic activity.

In one embodiment, to define an acoustic map capturing the dominant direction of propagations without ambiguities, a multidimensional spatial coherence likelihood function is defined as:

$$d_l^k(dT_1) = 1 + \cos\left(\angle f_1(l, k) - 2\pi \frac{k}{K} f_s dT_1\right) \quad (3)$$

$$d_l^k(dT_2) = 1 + \cos\left(\angle f_2(l, k) - 2\pi \frac{k}{K} f_s dT_2\right)$$

-continued $$d_l^k(dT_1, dT_2) = d_l^k(dT_1) d_l^k(dT_2)$$

$$p_l(dT_1, dT_2) = \sum_k \exp^{-\gamma[1 - d_l^k(dT_1, dT_2)/4]}.$$

In far-field, we can approximate the acoustic wave as planar. Therefore, the TDOA will only depend on the angle $\theta$ and azimuth $\phi$ which are related to the relative angular position of the source with the respect to each microphone pair. For simplicity, the generic mapping may be represented as $$(dT_1, dT_2) = g(\theta, \phi) \quad (4)$$

and define the spatial coherence function as $$p_l(g(\theta, \phi)) = \sum_k \exp^{-\gamma[1 - d_l^k(g(\theta,\phi))/4]} \quad (5)$$

By scanning all the possible $\theta$ and $\phi$, the system evaluates the likelihood that a source is emitting from a particular direction and azimuth in the space. The exp function controlled by the parameter $\gamma$ acts as a kernel function which is able to increase the spatial resolution and allows the discrimination of multiple sources dominating different frequencies.

Source Position for the 4 Microphone Array

Figure 5B:
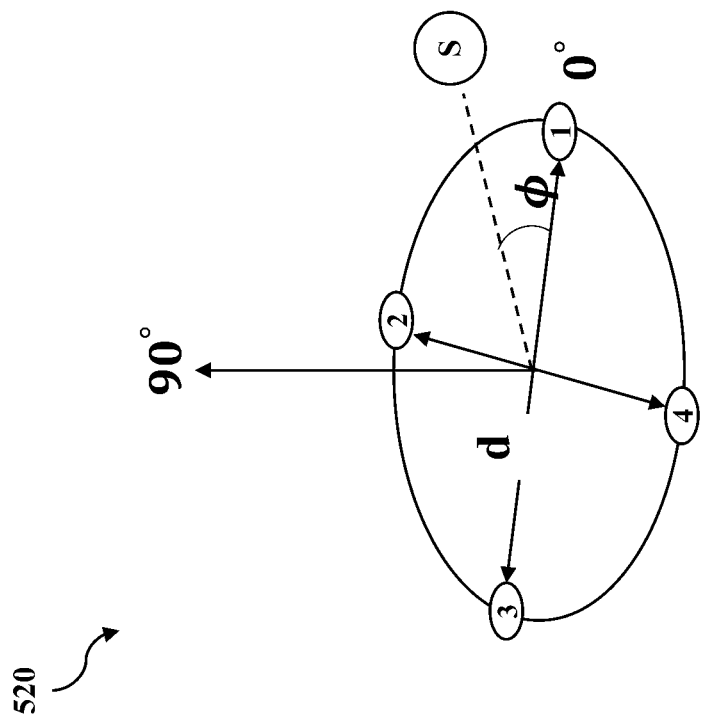
FIGS. 5A & 5B illustrate a top view and front view, respectively, of a microphone array geometry, in accordance with one or more embodiments of the present disclosure.
Figure 5A:
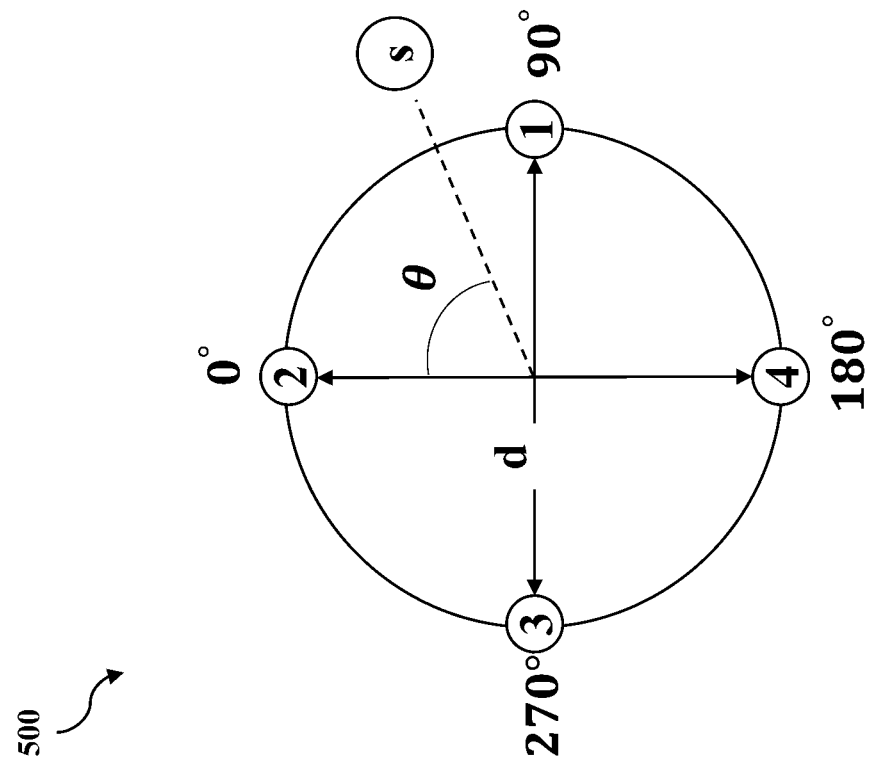

In various embodiments, the mapping between source positions and the TDOA pair $(dT_1, dT_2)$ depends on the microphone array geometry. FIGS. 5A and 5B illustrate an exemplary mapping for the specific case of 4 microphones in a cross (or circular) geometry. In this embodiment, the pairs $(m_1, m_2)$ and $(m_3, m_4)$ correspond to the microphones pairs (4,2) and (3,1) in the figures. According to the geometrical convention in FIGS. 5A and 5B, the mapping between the geometrical position $(\theta, \phi)$ with the TDOA pair $(dT_1, dT_2)$ is defined as $$dT_1 \simeq \frac{d}{c} \cos(\theta) \cos(\phi) \quad (6)$$

$$dT_2 \simeq \frac{d}{c} \cos(90 - \theta) \cos(\phi)$$

where $dT_1 = T_4 - T_2$, $dT_2 = T_3 - T_1$ and c is the sound speed in the air. To be consistent with the model, the spatial likelihood function is computed with the normalized cross-correlation features $$f_1(l, k) = \frac{X_4(l, k) X_2(l, k)^*}{|X_4(l, k) X_2(l, k)^*|} \quad (7)$$

$$f_2(l, k) = \frac{X_3(l, k) X_1(l, k)^*}{|X_3(l, k) X_1(l, k)^*|}.$$

Dominant DOA Buffering

In various embodiments, the spatial likelihood function is evaluated on a grid of values for $\theta$ and $\phi$ according to the desired resolution, i.e. it is evaluated with the pairs $(\theta_i, \phi_j)$ where (i,j) indicates the indexes of the elements in the 2-dimensional grid. Instead of simply averaging the likelihood over multiple frames, sparsity is imposed in the likelihood by selecting only the most $N_a$ dominant positions which are buffered in a FIFO (e.g., FIFO of dominant locations component 315 of FIG. 3) as $$Q_l(i, j, q) = p_l(g(\theta_i, \phi_j))/C_l, \text{ if } (i, j) \in P_l \quad (8)$$
$$= 0, \text{ otherwise}$$

where $P_l$ is the set of the discrete $N_a$ dominant 2-dimensional directions in the $l^{th}$ frame, q is a circular index pointing to the element of the FIFO, which is updated for each frame l, and $Q_l$ indicates the FIFO buffer at the frame l. Here $C_l$ indicates a normalization factor which gives to the function value the meaning of a posterior probability and is computed as $$C_l = \sum_{i,j} p_l(g(\theta_i, \phi_j)). \quad (9)$$

Next, the dominant source direction indexes are computed from the first $N_b$ maxima of the average spatial coherence function which is defined as $$L_l(i) = \sum_q max_j Q_l(i, j, q) \quad (10)$$

By using the $max_j$ operator the system implicitly assumes that it is not interested in discriminating two sources located at the same $\theta_i$ (even if they have a different azimuth $\phi_j$).

Disjoint Source Tracking

Various embodiments are directed to building a spatial enhancement system to enhance the dominant speech coming from a certain region in the pace and suppress the remaining interfering noise. The source tracker 320 tracks the most dominant N source locations by assuming that each source does not occupy the same angular region. Thus, the system defines a tracker structure Tracker$_j$(l), which tracks for the $j^{th}$ source (with j=1, ..., N) the following quantities Tracker$_j$(l). θ: angular direction;
Tracker$_j$(l). φ: angular tilt;
Tracker$_j$(l). lik: average spatial coherence likelihood value;
Tracker$_j$(l). power: average power;
Tracker$_j$(l). map[ ]: a vector representing the discrete average spatial coherence map associated to the tracker.

Because the localization is performed in the circular 360° space, the circular distance cd[x,y] metric may be defined as $$e = |x - y| \quad (11)$$
$$cd[x, y] = e, \text{ if } z < 180$$
$$= 360 - e, \text{ if } e \geq 180$$

Figure 6:
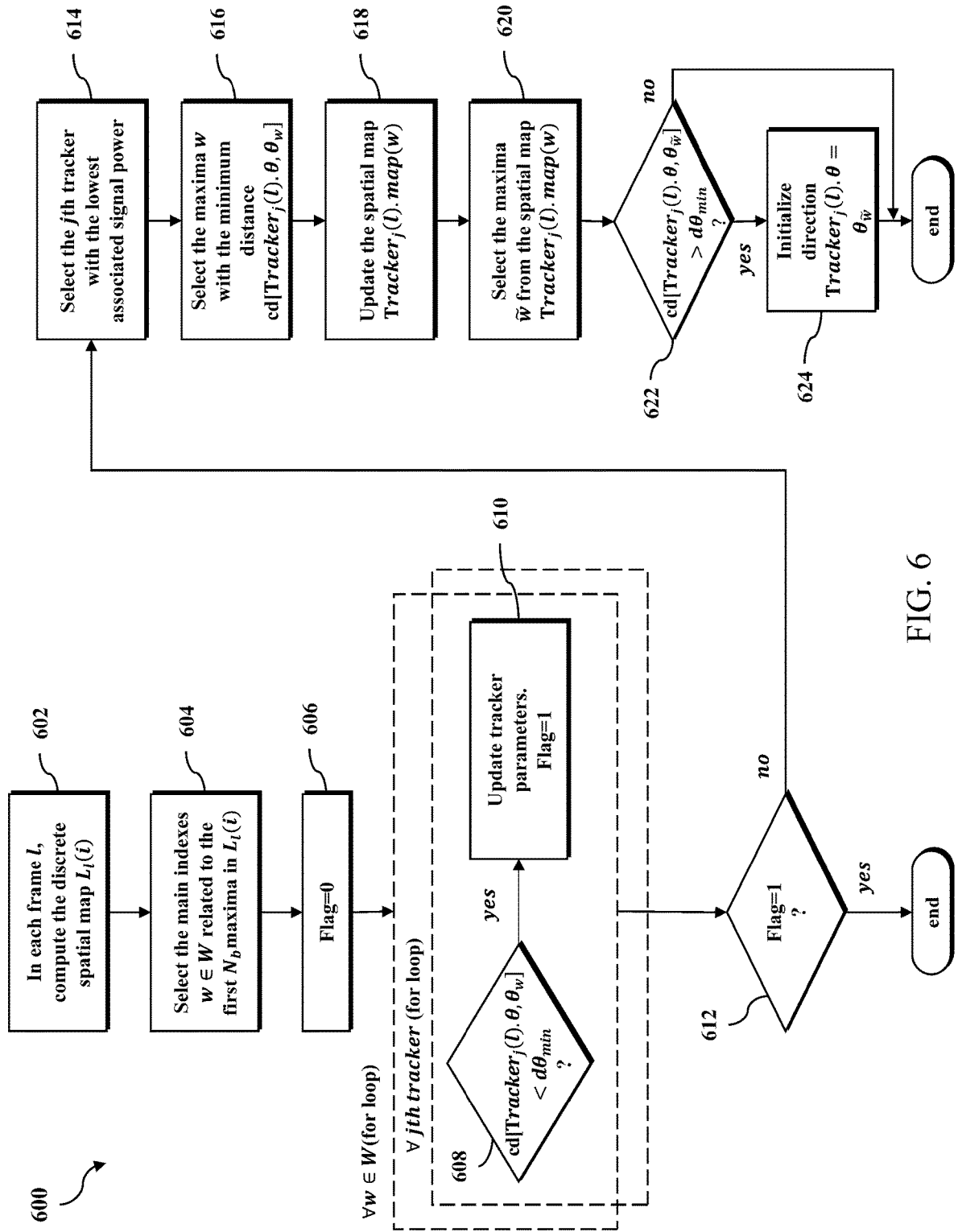
FIG. 6 is a flow chart illustrating a target tracking algorithm, in accordance with one or more embodiments of the present disclosure.

Referring to FIG. 6, a target tracking algorithm in accordance with one or more embodiments will now be described. In step 602, the discrete spatial map $L_l(i)$ is computed for each frame l. The indexes w∈W corresponding to the first $N_b$ maxima in $L_l(i)$ are extracted in step 604. In step 606, a flag is set to zero before processing updating the tracker parameters.

The candidate locations are associated to the trackers with minimum circular distance $$j = \arg \max_z \{cd[Tracker_z(l)\cdot\theta, \theta_w]\} \quad (12)$$

For each w∈W, if d(Tracker$_j$(l)·θ,θ$_w$)<dθ$_{min}$, the tracker variables are updated as follows $$\tilde{\alpha} = L_l(w)(1 - \alpha) \quad (13)$$
$$Tracker_j(l)\cdot\theta = Tracker_j(l)\cdot\theta + \tilde{\alpha}[\theta_w - Tracker_j(l)\cdot\theta] \quad (14)$$
$$Tracker_j(l)\cdot\phi = Tracker_j(l)\cdot\phi + \tilde{\alpha}[\varnothing_w - Tracker_j(l)\cdot\varnothing] \quad (15)$$
$$Tracker_j(l)\cdot lik = Tracker_j(l)\cdot lik + \alpha[L_l(w) - Tracker_j(l)\cdot\theta] \quad (16)$$
$$Tracker_j(l)\cdot power = Tracker_j(l)\cdot power + \alpha[\Sigma_{m,k}p(l)|S_m(l,k)|^2 - Tracker_j(l)\cdot\theta] \quad (17)$$
$$Tracker_j(l)\cdot map(w) = Tracker_j(l)\cdot map(w) + \alpha[L_l(w) - Tracker_j(l)\cdot map(w)] \quad (18)$$
$$Tracker_j(l)\cdot map(\hat{w}) = (1-\alpha)Tracker_j(l)\cdot map(\hat{w}), \forall \hat{w} \neq w \quad (19)$$

where α is a time-constant parameter (0<α<1) and p(l) is the probability of speech presence in the frame l, which can be determined by an external voice activity detector. In some embodiments, a voice activity detector may be implemented based on spectral features and/or use a Neural-Networks, such as disclosed in U.S. patent application Ser. No. 15/832,709, entitled "VOICE ACTIVITY DETECTION SYSTEMS AND METHODS," which is hereby incorporated by reference. For each w and j, the condition cd[Tracker$_j$(l).θ,θ$_w$]<dθ$_{min}$ is tested and if it is true, the flag is set to one (step 610). If the condition cd[Tracker$_j$(l).θ,θ$_w$]<dθ$_{min}$ (step 608) is never true for any w and j, then the detection mechanism is employed (step 612). If the flag equals zero (step 612), then control passes to step 614, where the $j^{th}$ tracker with the lowest associated power is selected. In step 616, the maxima w is selected with the minimum distance cd[Tracker$_j$(l).θ, θ$_w$]. Next, the relative spatial likelihood map Tracker$_j$(l).map is updated (step 618). In step 620, the index of the direction of maximum spatial likelihood is computed as $$\hat{w} = \arg \max_w \{Tracker_j(l)\cdot map(w)\} \quad (20)$$

Then, if cd[Tracker$_j$(l).θ,θ$_{\hat{w}}$]>dθ$_{min}$ (step 622), the tracker direction, Tracker$_j$(l).θ, is initialized to θ$_{\hat{w}}$. In various embodiments, this detection mechanism helps to ensure that a tracker with low associated power could forget its current state and "jump" to a new direction, when the smooth spatial coherence map, which acts as an approximated probability density function, is maximized by the new direction.

Inter Source Repulsion

Figure 7:
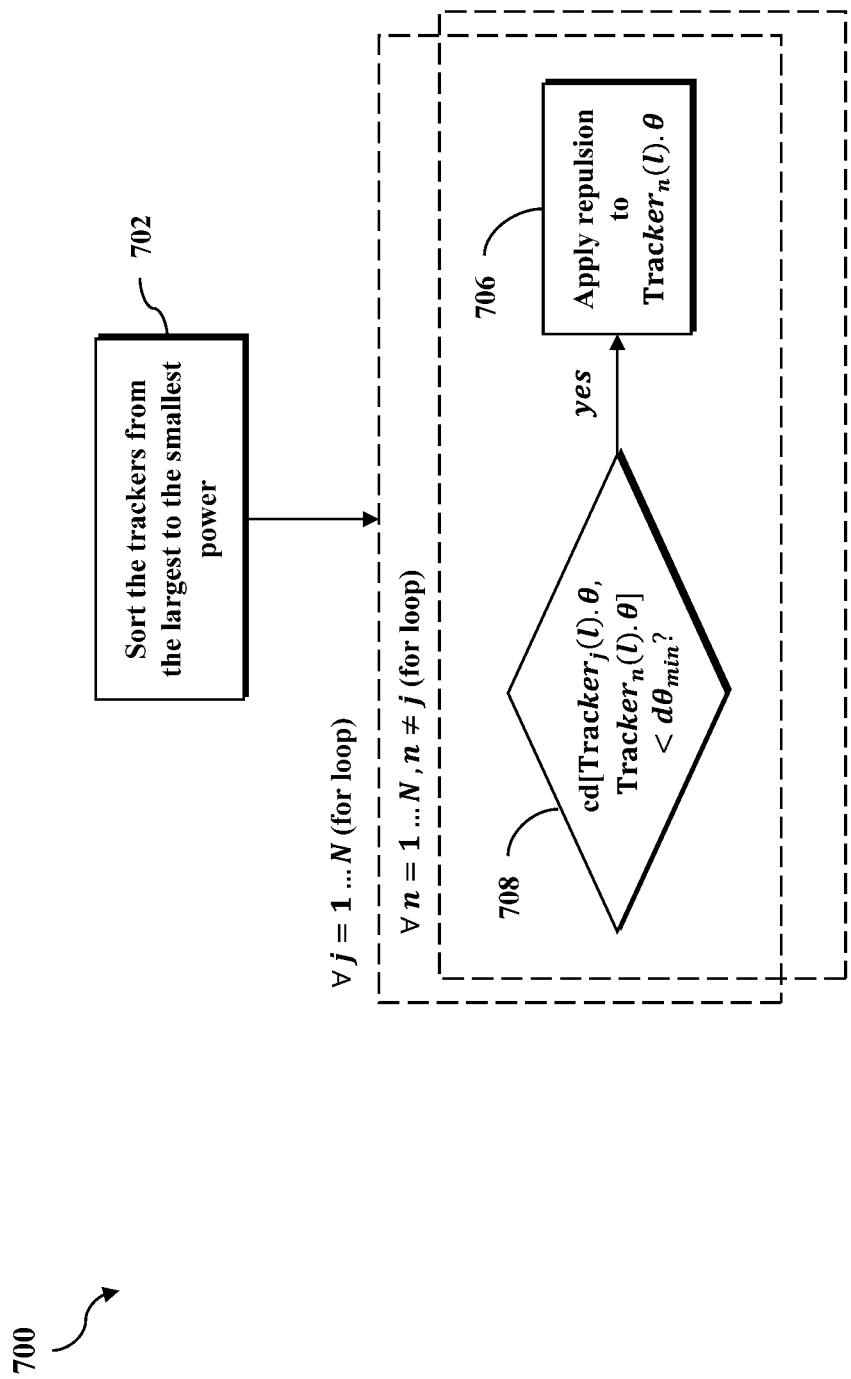
FIG. 7 is a flow chart illustrating a repulsion algorithm, in accordance with one or more embodiments of the present disclosure.

In one or more embodiments, a desired characteristic for the trackers is disjointness, i.e. the angular regions pointed by each tracker should not overlap. While the described clustering approach enforces disjointness, it does not prevent two trackers from collapsing to a similar direction. Therefore, a repulsion mechanism may be employed. An embodiment is illustrated in the flow chart in FIG. 7 and it is based on the following criteria: (i) the trackers are sorted by the decreasing power so that the trackers with larger power have a greater repulsion priority; (ii) starting from the first tracker, the tracked direction θ is compared with the ones of the remaining trackers. If the inter-tracker distance is smaller than θ$_{min}$, the directions of the lower trackers are circularly shifted in order to impose an inter-tracker distance of dθ$_{min}$. The procedure continues in a loop until all the trackers are scanned.

Release and Source Inactivity

The tracking mechanism described in the previous sections assume that the sources are all equally active and that the number of sources does not change over time. However, in real-world this cannot be guaranteed. Furthermore, the short-time dominance of each direction can change as the average loudness of the sources is not time-invariant. Therefore, to prevent that trackers remain indefinitely locked on sources that became silent for a long time, a release mechanism is employed. At each frame l, the trackers that were not updated, i.e. there was no $\theta_w$ for which $cd[Tracker_z(l).\theta,\theta_w]<\theta_{min}$, are updated as $$Tracker_j(l)\cdot power = \beta \times Tracker_j(l)\cdot power \quad (21)$$

$$Tracker_j(l)\cdot map(w) = \beta \times Tracker_j(l)\cdot map(w), \forall w \quad (22)$$

where $\beta$ is a time constant ($0<\beta<1$). Therefore, as the tracker becomes inactive, the power and the spatial map goes to zero promoting new directions to be detected.

Source Enhancement

In various embodiments, the tracking information is used to drive a multichannel speech enhancement system. For each frame l of the multichannel audio input signal, the tracking mechanism generates the following information which may be used by the multichannel speech enhancement system:

The indexes dom∈Z of the M most dominant trackers (i.e., the trackers associated to the sources with the largest power);

The position of the dominant sources $\theta_{dom}=Tracker_{dom}(l).\theta$, $\phi_{dom}=Tracker_{dom}(l).\phi$;

A directional voice activity detection (VAD) which may be defined as $$VAD_{dom}(l) = 1, \quad (23)$$

{if exists $w | cd[\theta_{dom}, \theta_w] < d\theta_{min}$, with $w \in W$} = 0, otherwise Both the source direction and the directional VAD can then be used for multichannel enhancement (e.g., by target enhancement engine 230 of FIG. 2) such as minimum variance distortionless response (MVDR), linearly constrained minimum variance (LCMV) or Generalized Eigenvalue (GEV) beamformers. In one embodiment, an adaptive minimum variance beamformer is proposed with a soft constraint to promote unit gain in the target direction $\theta_{dom}$.

Given the source position $(\theta_{dom}, \phi_{dom})$ a steering vector is computed as $$\theta(k) = \left[1, \exp^{-2\pi j \frac{k}{K} f_s dT_{12}(\theta_{dom},\phi_{dom})}, \ldots, \exp^{-2\pi j \frac{k}{K} f_s dT_{1(M-1)}(\theta_{dom},\phi_{dom})}\right]^T \quad (24)$$

where $dT_{1m}(\theta_{dom},\phi_{dom})$ indicates the relative time-difference of arrival between the first and the $m^{th}$ mic, according to the array geometry and the source location. We define the input vector as $$X(l,k) = [X_1(l,k), \ldots, X_M(l,k)]^T, \quad (25)$$

and the output of the filter as $$Y(l,k) = G(k)^H X(l,k) \quad (26)$$

with $G(k) = [G_1(k), \ldots, G_M(k)]^T$ represent the multichannel spatial filter.

At each frequency bin, the multichannel filter is updated to minimize the cost function $$C = \frac{1}{L}\sum_l (VAD(l) - 1)Y(l,k)^2 + \gamma\|1 - G(k)^H \theta(k)\|^2, \quad (27)$$

where $Y(l,k)^2 = Y(l,k)*Y(l,k)$, and $\gamma$ is a factor controlling the unit gain constraints in the source direction. The left-side term in the equation represents the weighted output variance, while the right-side term is Lagrange multiplier introducing a soft geometrical constraint. This method can be interpreted as a soft MVDR which works better in far-field as it does not impose a hard unit gain constraint in the source direction. In the presence of reverberation, the propagation direction of the acoustic waves does not match the exact anechoic direction. Therefore, a soft constraint is expected to better fit the acoustic conditions, producing less distortion and more noise attenuation. The filter G(k) can be updated on-line with any gradient based method, e.g. through a normalized gradient descent as $$G^{l+1}(k) = G^l(k) - \mu\left\{[VAD(l) - 1]X(l,k)^H G^l(k)\frac{X(l,k)}{X(l,k)^H X(l,k)} + \gamma\left[1 - G^l(k)^H \theta(k)\right]^H \theta(k)\right\} \quad (28)$$

where $G^l(k)$ indicates the filter estimated at the frame l and $\mu$ is the adaptation step-size.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. An audio processing device comprising:
    an audio sensor array configured to receive a multichannel audio input and generate a corresponding multichannel audio signal; and
    a target activity detector configured to identify audio target sources in the multichannel audio signal, the target activity detector comprising:

an instantaneous locations component configured to detect locations of a plurality of audio sources based at least in part on a calculation of a multidimensional spatial coherence likelihood that one of the audio sources is emitting from a particular location;

a dominant locations component configured to selectively buffer a subset of the plurality of audio sources comprising dominant audio sources;

a source tracker configured to track locations of the dominant audio sources over time;

a power speech dominance estimation component configured to associate a level of dominance to each track; and a dominance selection component configured to select the dominant audio sources for further audio processing.

2. The audio processing device of claim 1, further comprising a sub-band analysis component arranged to receive the multichannel audio signal and transform each channel into a plurality of frequency sub-bands.

3. The audio processing device of claim 2, wherein the target activity detector further comprises an average speech power component configured to calculate an average signal power for detected speech frames of the plurality of frequency sub-bands.

4. The audio processing device of claim 3 further comprising a synthesizer configured to reconstruct the plurality of frequency sub-bands to form a time domain signal comprising an enhanced audio signal.

5. The audio processing device of claim 1 wherein the instantaneous location component is further configured to compute a discrete spatial map comprising the location of the plurality of audio sources.

6. The audio processing device of claim 1 wherein the audio sensor array comprises at least two non-linear microphone pairs; and wherein the instantaneous locations component is further configured to calculate a time difference of arrival for each non-linear microphone pair.

7. The audio processing device of claim 6 wherein the instantaneous locations component is further configured to perform a 360-degree scan for the plurality of audio sources; and wherein the instantaneous locations component is further configured to detect locations of the plurality of audio sources based at least in part on a calculation of the multidimensional spatial coherence likelihood that a source is emitting from a particular scanned location.

8. The audio processing device of claim 1 further comprising a target enhancement engine configured to receive the multichannel audio signal and dominant target sources information and output the enhanced audio signals comprising the most dominant target sources.

9. An audio processing device comprising:
an audio sensor array configured to receive a multichannel audio input and generate a corresponding multichannel audio signal; and
a target activity detector configured to identify audio target sources in the multichannel audio signal, the target activity detector comprising:
an instantaneous locations component configured to detect a location of a plurality of audio sources;
a dominant locations component configured to selectively buffer a subset of the plurality of audio sources comprising dominant audio sources;
a source tracker configured to track locations of the dominant audio sources over time;
a power speech dominance estimation component configured to associate a level of dominance to each track; and
a dominance selection component configured to select the dominant audio sources for further audio processing;
wherein the instantaneous location component is further configured to compute a discrete spatial map comprising the location of the plurality of audio sources; and
wherein the dominant locations component is further configured to select N of the dominant sources from the discrete spatial map.

10. The audio processing device of claim 9 wherein the source tracker is further configured to apply a repulsion to the dominant audio sources.

11. A method for processing audio signals, comprising:
receiving, via an audio sensor array, a multichannel audio input and generating a corresponding multichannel audio signal; and
detecting, via a target activity detector, an audio target source in the multichannel audio signal, wherein the detecting comprises:
detecting an instantaneous location of each of a plurality of audio sources in the multichannel audio signal based at least in part on a calculation of a multidimensional spatial coherence likelihood that one of the audio sources is emitting from a particular location;
buffering a plurality of dominant audio source locations selected from the plurality of audio sources;
tracking audio source locations, including the dominant audio source locations;
estimating power speech dominance to associate a level of dominance to each track; and
selecting the dominant audio sources for further audio processing.

12. The method of claim 11 further comprising transforming each channel of the multichannel audio signal into a series of frames comprising a plurality of frequency sub-bands.

13. The method of claim 12 wherein detecting an audio target source further comprises calculating an average signal power for the speech frames of the plurality of frequency sub-bands.

14. The method of claim 13 further comprising reconstructing the frequency sub-bands into a time domain signal comprising an enhanced audio signal.

15. The method of claim 11 wherein detecting an instantaneous location further comprises computing a discrete spatial map.

16. The method of claim 15 wherein the buffering the plurality of dominant audio source locations further comprises selecting N dominant sources from the discrete spatial map.

17. The method of claim 11 wherein tracking audio source locations further comprises applying a repulsion to the dominant audio source locations.

18. The method of claim 11 wherein the audio sensor array comprises at least two non-linear microphone pairs; and
wherein detecting an instantaneous location further comprises calculating a time difference of arrival for each non-linear microphone pair.

19. The method of claim 18 wherein detecting an instantaneous location further comprises performing a 360-degree scan for the plurality of audio sources and is based at least in part on a calculation of the multi-dimensional spatial coherence likelihood that a source is emitting from a particular scanned location.

20. The method of claim 11 further comprising enhancing the most dominant target sources in the multichannel audio signal to generate multiple enhanced audio signal outputs.

\* \* \* \* \*